United States Patent
Khmelev et al.

(10) Patent No.: US 12,047,166 B1
(45) Date of Patent: Jul. 23, 2024

(54) ANTI-SURVEILLANCE SYSTEM AND METHOD FOR PERSONAL DEVICES

(71) Applicant: UIPCO, LLC, San Antonio, TX (US)

(72) Inventors: Yevgeniy Viatcheslavovich Khmelev, San Antonio, TX (US); Christopher Russell, The Colony, TX (US); Gregory David Hansen, San Antonio, TX (US); Nathan Lee Post, Rockport, TX (US); Ashley Raine Philbrick, San Antonio, TX (US); Nolan Serrao, Plano, TX (US); Ruthie D. Lyle, Durham, NC (US); Pooja Krishnaswamy, McKinney, TX (US); Noemy Diosdado, Como, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 499 days.

(21) Appl. No.: 17/356,684

(22) Filed: Jun. 24, 2021

Related U.S. Application Data

(60) Provisional application No. 63/044,732, filed on Jun. 26, 2020.

(51) Int. Cl.
| | |
|---|---|
| *H04K 3/00* | (2006.01) |
| *G06F 21/62* | (2013.01) |
| *H04W 12/102* | (2021.01) |
| *H04W 12/79* | (2021.01) |
| *H04W 76/30* | (2018.01) |

(52) U.S. Cl.
CPC ......... *H04K 3/822* (2013.01); *G06F 21/6263* (2013.01); *H04K 3/825* (2013.01); *H04W 12/102* (2021.01); *H04W 12/79* (2021.01); *H04W 76/30* (2018.02)

(58) Field of Classification Search
None
See application file for complete search history.

(56) References Cited

U.S. PATENT DOCUMENTS

| | | | | |
|---|---|---|---|---|
| 8,055,184 | B1* | 11/2011 | DiMartino | H04K 3/825 |
| | | | | 235/382 |
| 10,805,012 | B1* | 10/2020 | Li | H04W 4/80 |
| 2013/0219457 | A1* | 8/2013 | Touboul | G06F 21/562 |
| | | | | 726/1 |
| 2015/0350902 | A1* | 12/2015 | Baxley | H04W 4/90 |
| | | | | 726/7 |
| 2016/0292464 | A1* | 10/2016 | Alarabi | H04L 63/0876 |
| 2017/0134895 | A1* | 5/2017 | Rabb | G08B 29/24 |
| 2018/0097821 | A1* | 4/2018 | Benitez | H04W 4/80 |
| 2019/0098022 | A1* | 3/2019 | Khurana | H04L 63/0245 |
| 2019/0199756 | A1* | 6/2019 | Correnti | H04W 12/08 |
| 2020/0145830 | A1* | 5/2020 | Wang | H04W 12/12 |
| 2021/0014690 | A1* | 1/2021 | Ljung | H04L 43/0817 |

\* cited by examiner

*Primary Examiner* — Marcus E Windrich
(74) *Attorney, Agent, or Firm* — Plumsea Law Group, LLC

(57) ABSTRACT

A method and system of protecting network activity of mobile devices is disclosed. Specifically, the methods and systems enable the detection of surveillance signals targeting or potentially targeting a user's personal device and automatically triggering a protective response to safeguard the user's information. The proposed systems can provide mobile device users with a powerful security capability by enabling their device to automatically disconnect from one or more networks and/or emitting a protective jamming signal in response to the detection of nearby potential surveillance activities.

20 Claims, 10 Drawing Sheets

ANTI-SURVEILLANCE SYSTEM AND METHOD FOR PERSONAL DEVICES

CROSS-REFERENCE TO RELATED APPLICATION

This application claims the benefit of U.S. Provisional Patent Application Ser. No. 63/044,732 filed on Jun. 26, 2020 and titled "Anti-Surveillance System and Method for Personal Devices", the disclosure of which is incorporated by reference in its entirety.

TECHNICAL FIELD

The present disclosure generally relates to the protection and security of personal device data, and specifically to a method and system for preventing the monitoring or surveillance of personal device activity by unauthorized persons.

BACKGROUND

A key consideration during use of a communication network is its ability to ensure privacy, safety, and security to the client using it. As communication technology has evolved, so too has the sophistication of criminals and hackers intending to inflict mischief, disrupt systems, steal money, and accidentally or maliciously harm others. Credit card fraud, stolen passwords, identity theft, location tracking, and the unauthorized publicizing of confidential information, private pictures, files, emails, text messages, and private tweets are but a few examples of modern cybercrime. Mobile phones have become ubiquitous and basic communications tools—now used not only for phone calls, but also for accessing the Internet, sending and receiving text messages, and documenting the world. Unfortunately, mobile phones and other personal devices are often poorly secured and typically offer limited privacy and security.

In many cases, mobile devices can be readily 'hacked' to detect a user's personal communications, and even more easily expose users to a wide range of surveillance risks, such as location tracking. In general, mobile phones provide users much less control of privacy settings than a personal desktop or laptop computer would. In contrast to standard computing devices, it is far more challenging for most mobile phone consumers to replace their operating systems, investigate malware attacks, remove or replace undesirable bundled software, and harder to prevent parties such as a mobile operator from monitoring how the device is used. Users are faced with an inability to protect the privacy of their own cellular data usage and signals.

There is a need in the art for a system and method that addresses the shortcomings discussed above.

SUMMARY

In one aspect, a method of protecting a mobile device from cyber-surveillance is disclosed. The method includes a first step of receiving first data representing network activity of the mobile device for a first time period. In addition, the method includes a second step of determining a triggering event has occurred based at least in part on the received first data indicating an abnormal pattern of network activity during the first time period. Furthermore, the method includes a third step of executing, in response to determining that the triggering event has occurred, a first protective response that causes a deactivation of at least a first type of communication protocol of the mobile device.

In another aspect, an alternate method of protecting a mobile device from cyber-surveillance is disclosed. The method includes steps of receiving first data representing location activity of the mobile device, as well as determining a triggering event has occurred based at least in part on the received first data indicating the mobile device has entered a high-risk area for network usage. The method further includes executing, in response to determining that the triggering event has occurred, a first protective response that causes a deactivation of at least a first type of communication protocol of the mobile device.

In another aspect, a system for protecting a mobile device from cyber-surveillance includes a processor and machine-readable media including instructions which, when executed by the processor, cause the processor to receive first data representing network activity of the mobile device for a first time period, as well as determine a triggering event has occurred based at least in part on the received first data indicating an abnormal pattern of network activity during the first time period. The instructions further cause the processor to execute, in response to determining that the triggering event has occurred, a first protective response that causes a deactivation of at least a first type of communication protocol of the mobile device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
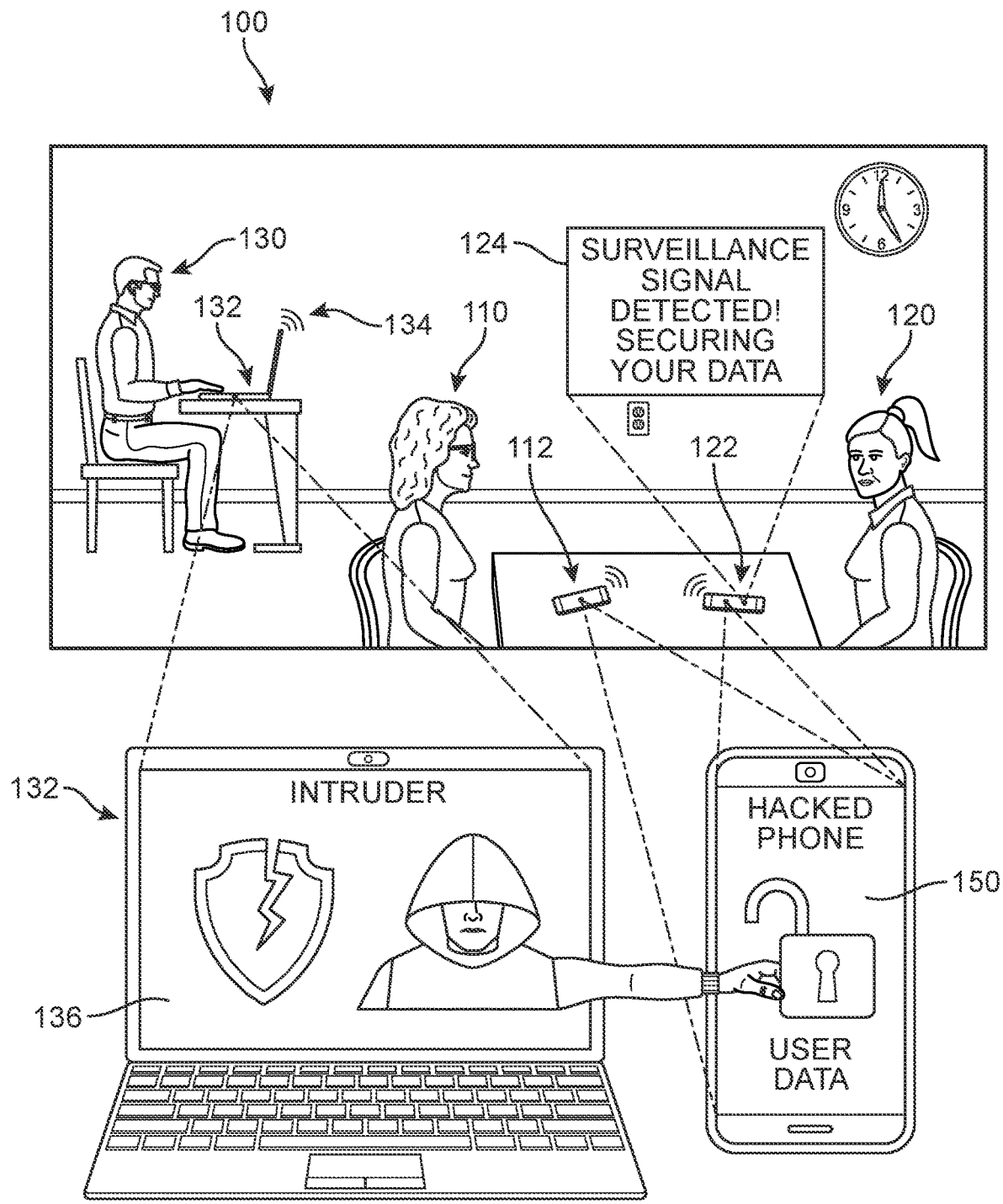
FIG. 1 is an overview of a scenario in which an unauthorized person may collect data from nearby users and a protective mechanism being implemented to secure a user's data, according to an embodiment.

The embodiments provide methods and systems to improve the security of data stored in and/or generated by personal mobile computing devices ("personal devices"), such as mobile smartphones, tablets, and other mobile devices. Specifically, the proposed methods and systems enable the device to initiate a protective response to safeguard the user's information in response to the detection of surveillance signals targeting or potentially targeting a user's personal device. Without device safeguards, a wide variety of personal user data may be intercepted. For example, the unauthorized persons can access both passive signals emitted by the device, as well as the phone's microphone, camera, log keystrokes, and screen captures which can circumvent secure communication applications ("apps"). The proposed systems can provide mobile device users an option whereby the device is capable of automatically disconnecting the device from a network and/or emitting a protective jamming signal in response to the detection of an intrusive signal. The protective response can be used to shield the device from unauthorized persons using surveillance devices or software to monitor the activity of the device. Without such a system, user data can remain exposed and potentially be captured by 'bad actors' or other unauthorized users. Furthermore, by providing users with a mechanism by which to protect potentially sensitive data, the likelihood of identity theft or other losses is reduced. The present systems and methods may therefore be seen as protecting individuals from a wide range of harms.

For purposes of this application, personally identifiable information (PII) should be understood to include any personal information about an individual and/or persons connected to that individual. PII may also be referred to as sensitive data. PII can encompass data that either contains personally identifiable information, regulated data, financial information, classified data, or any data that would cause harm to an individual or an organization if it were to be compromised. Some examples of PII will be discussed with reference to FIG. 3 below.

As a general matter, two major security considerations related to digital communications include (a) cybersecurity and (b) cyberprivacy. Cybersecurity encompasses network security, computer security, and secure communications, methods employed to monitor, intercept, and prevent unauthorized access, misuse, modification, or denial of a computer or communications network, network-accessible resources, or the data contained within network connected devices. Such data may include personal information, biometric data, financial records, health records, private communications and recordings, as well as private photographic images and video recordings. Network-connected devices include cell phones, tablets, notebooks, desktops, file servers, email servers, web servers, data bases, personal data storage, cloud storage, Internet-connected appliances, connected cars, as well as publicly shared devices used by an individual such as point-of-sale or POS terminals, gas pumps, ATMs, etc.

In addition, cyberprivacy encompasses Internet privacy, computer privacy, and private communications, and involves an individual's personal right or mandate to control their personal and private information and its use, including the collection, storage, displaying or sharing of information with others. Private information may involve PII including height, weight, age, fingerprints, blood type, driver's license number, passport number, social-security number, or any personal information useful to identify an individual even without knowing their name. Similarly, non-personal private information may include what brands of clothes we buy, what web sites we frequent, whether we smoke, drink, or own a gun, what kind of car we drive, what diseases we may have contracted in our life, whether our family has a history of certain diseases or ailments, and even what kind of people we are attracted to. This private information, when combined with public records relating to personal income, taxes, property deeds, criminal records, traffic violations, and any information posted on social media sites, forms a powerful data set for interested parties.

Furthermore, the term "cellphone surveillance" (also known as cellphone spying or cyber spying) may involve the tracking, monitoring, eavesdropping, and recording of conversations and text messages on mobile devices. This surveillance also encompasses the monitoring of people's movements, which can be tracked using mobile device signals when phones are turned on and connected to a network. For purposes of reference, some examples of smartphone surveillance and tracking techniques will now be described briefly, including mobile signal tracking and Wi-Fi and Bluetooth tracking.

Mobile signals may generally be tracked via cell towers or IMSI catchers. In the case of cell towers, it is well known that mobile network/SIM-card operators themselves have the ability to intercept and record all of the data about visited websites, the identity of those who called or sent an SMS, as well as to whom, when, and what they said. A Wi-Fi internet provider typically offers DNS (domain name service) as part of its service, which allows the same provider to also log your DNS traffic—in essence, recording a person's entire browsing history. Thus, any mobile network operator can also precisely calculate where a particular subscriber's phone is located whenever the phone is powered on and registered with the network. The ability to do this is called triangulation. One way the operator can do this is to monitor the signal strength that different towers observe from a particular mobile phone, and then calculate where that phone must be located based on the observations. The accuracy with which the operator can figure out a subscriber's location varies, depending on many factors including the technology the operator uses (2G/3G/LTE) and cell tower numbers in the vicinity.

While normally only the mobile operator itself can perform this kind of tracking, this information might be available to local or foreign governments through official or informal arrangements. In some cases, foreign governments have also hacked mobile operators' systems in order to obtain secret access to users' data. For example, the Ukrainian government is known to have used a "tower dump" to make a list of all of the people whose mobile phones were present at an anti-government protest. A "tower dump" is a surveillance request made by the government asking a mobile operator for a list of all of the mobile devices that were present in a certain area at a certain time. Oftentimes, law enforcement agencies (LEAs) use tower dumps to investigate a crime, or to establish criminal relationships. Unfortunately, most consumers cannot "hide" from this kind of tracking as long as their mobile phone is powered on and transmitting signals to an operator's network. As will be discussed below, the proposed system therefore offers users the ability to protect their mobile devices by triggering an automated "air-gap" as a real-time response to potential threats, where the device is disconnected from the network or to any other computer.

Furthermore, while the highest performance communication systems today comprise custom digital hardware owned by the world's major long-distance carriers such as AT&T, Verizon, NTT, Vodaphone, etc., because these networks are private, the actual data security is not publicly known, and security infractions, hacks, and break-ins are generally not reported to the public. Given the number of wire taps and privacy invasions reported in the press today, private carrier communication security remains suspect Mobile signals may also be tracked via IMSI (international mobile subscriber identity) sniffers/catchers, where the IMSI refers to a number that uniquely identifies every user of a cellular network. IMSI sniffers/catchers are a type of cell site simulator, or a portable device that generates fake cell phone tower to "catch" the particular users' mobile phone and detect their physical presence and/or spy on their communications, also sometimes called a Stingray. However, an IMSI catcher needs to be taken to a particular location in order to find or monitor a mobile device at or near that location. For example, by means of an IMSI sniffer, an attacker can gather all IMSIs that are active in a certain geographic area. An IMSI sniffer can achieve this in two different manners: passive and active. A passive sniffer will be simply observing unencrypted wireless traffic and storing all observed IMSIs. An active sniffer will be using a fake base station such as a fake Base Transceiver Station (BTS), to which mobile phones in the neighborhood will attempt to connect due to the detection of a stronger radio signal and the fake base station will request (with an Identity Request message) each user to identify itself.

Active IMSI sniffing is also referred to as "IMSI catching" in mobile network environments. Using the IMSI, unauthorized persons can identify mobile traffic on the network and target traffic for interception and analysis. In addition, once an IMSI catcher has completed the connection to a mobile device, it can try to prevent that mobile device from connecting to another legitimate base station (network tower stations) by transmitting an empty neighbor cell-tower list or a list with neighboring base stations that are unavailable to the mobile device. Thus, IMSI catchers actively interfere in communications between mobile phones and base stations by acting as a transceiver (simultaneously transmitting and receiving). In other words, IMSI catchers use a "man-in-the-middle" attack, by simultaneously posing as the fake mobile phone to the real base station and as the fake base station to the real mobile phone. An IMSI catcher can be used to facilitate cryptographic attacks (e.g., SS7 attacks or other downgrade attaches) that enable data theft, eavesdropping, text interception and location tracking. Such attacks can involve multiple layers of security breaches. For example, location tracking may not be limited simply to a person's current location, but also include information about the person's historical activities, participation in events, and/or their beliefs and personal relationships or connections. Location tracking can also be used to find out whether certain people are in a romantic relationship, to detect when a group of people are traveling together or regularly meeting one another, or to try and identify a journalist's confidential source. As with cell tower tracking, no reliable defense against most IMSI catchers have been conventionally available to users, other than manually disabling network connections.

Furthermore, smartphones and other mobile devices also have various other radio transmitters in addition to the mobile network interface, including Wi-Fi and Bluetooth support. Whenever Wi-Fi/Bluetooth is turned on, the smartphone transmits signals that include the MAC address, a unique serial number of the mobile device, and thus let nearby Wi-Fi/Bluetooth receivers recognize that a particular device is present. Using this, the MAC address can be observed even if a device is not actively connected to a particular wireless network, or even if it is not actively transmitting data. This form of tracking can be a highly accurate way to tell when a person enters and leaves a building. Similarly, the home Wi-Fi router is a prime target for hackers wanting to infiltrate a personal network by remotely delivering a payload. A small vulnerability in the home Wi-Fi network can give a hacker access to almost all the devices that connect to that Wi-Fi. Once infected with the malware/spyware, the router can perform various malicious activities like redirecting the user to fake websites while visiting secure communication services, banking or other e-commerce sites. In addition to stealing personal and financial data, hackers can also infect smart IoT devices connected to the home network.

For purposes of clarity, an overview of one embodiment of the proposed systems and methods is illustrated with reference to FIG. 1. In FIG. 1, a first customer 110 and a second customer 120 are enjoying a conversation together in a coffee shop 100. As is typical in today's society, each customer is accompanied by their personal mobile device, where first customer 110 has a first mobile phone ("first phone") 112 and second customer 120 has a second mobile phone ("second phone") 122. Both first phone 112 and second phone 122 are switched on and connected to the wireless hotspot network provided by the coffee shop 100. Devices often have settings that allow these connections to automatically connect, even if the user does not initiate it, particularly if the user has connected to this network in the past. Unfortunately, as noted earlier, connecting to an open Wi-Fi network exposes the mobile device to greater security risks.

In FIG. 1, an opportunistic hacker 130 has taken a position near to the customers of the coffee shop 100. The hacker 130 appears to simply be busy working on a laptop 132. However, the hacker 130 is able to attack nearby devices through the open Wi-Fi to which the first phone 112 and second phone 122 have connected and/or fool the user into connecting to a spoofed Wi-Fi network via one or more tracking systems 136. In this case, the tracking systems 136 enable the hacker 130 to monitor and/or collect user data 150 by manipulation of the local network shared by all of the devices. In other examples, the laptop or other surveillance device can be used to monitor the radio link generated by the nearby mobile phones as they connect to the cellular network through a cellular radio antenna and an LTE base station, and/or through short-range radio antenna and a public Wi-Fi base station. Similarly, an LTE call can be monitored or "sniffed" by an intercepting radio receiver or "sniffer" device. The same sniffer can be adjusted to monitor Wi-Fi communications. In some cases, an LTE call can also be intercepted by a pirate faux-tower, establishing a diverted communication path between the mobile phone(s) and a cellular tower. Through a series of security breaches, spyware can install itself on the mobile phone(s). The hacker 130 may be able to launch a cyber-attack applying one or a combination of techniques, including IP packet sniffing, Port interrogation, Profiling, Imposters, Packet-hijacking, Cyber-infections, Surveillance, and Pirate administration.

As will be described in greater detail below, the proposed systems can include provisions for automatically implementing a protective mechanism in response to a determination that a triggering event has occurred. For purposes of this application, a triggering event refers to an event or sequence of events that matches a pre-selected condition and will cause a security measure to be implemented, enabled, activated, implemented, and/or initiated. Some non-limiting examples of security measures include notification presented alerting the user of the detection of an intrusive signal, disconnection of the device from some or all networks, and/or generating a jamming signal to block the effects of the intrusive signal. In some other embodiments, the security measures can further include deletion of some or all of the individual's data, as well as management of encryption policies for the data, and/or alerts or reminders that can be transmitted to the user.

In FIG. 1, only second customer 120 has enabled an anti-surveillance service as described herein, while first customer 110 has not. Thus, when the service enabled on second phone 122 detects a potential surveilling signal 134, a protective mechanism 124 ("Surveillance signal detected! Securing your data . . . ") is automatically triggered. In this case, the service causes the second phone 122 to disconnect from any local Wi-Fi networks, and further disables its Bluetooth and cellular signal, thereby entering a "lockdown state" in which the phone is air-gapped. In addition, a message is presented on the display of the second phone 122 informing the user of this response. The data security of second phone 122 can then be managed and protected from access or hacking by unauthorized users.

Figure 2:
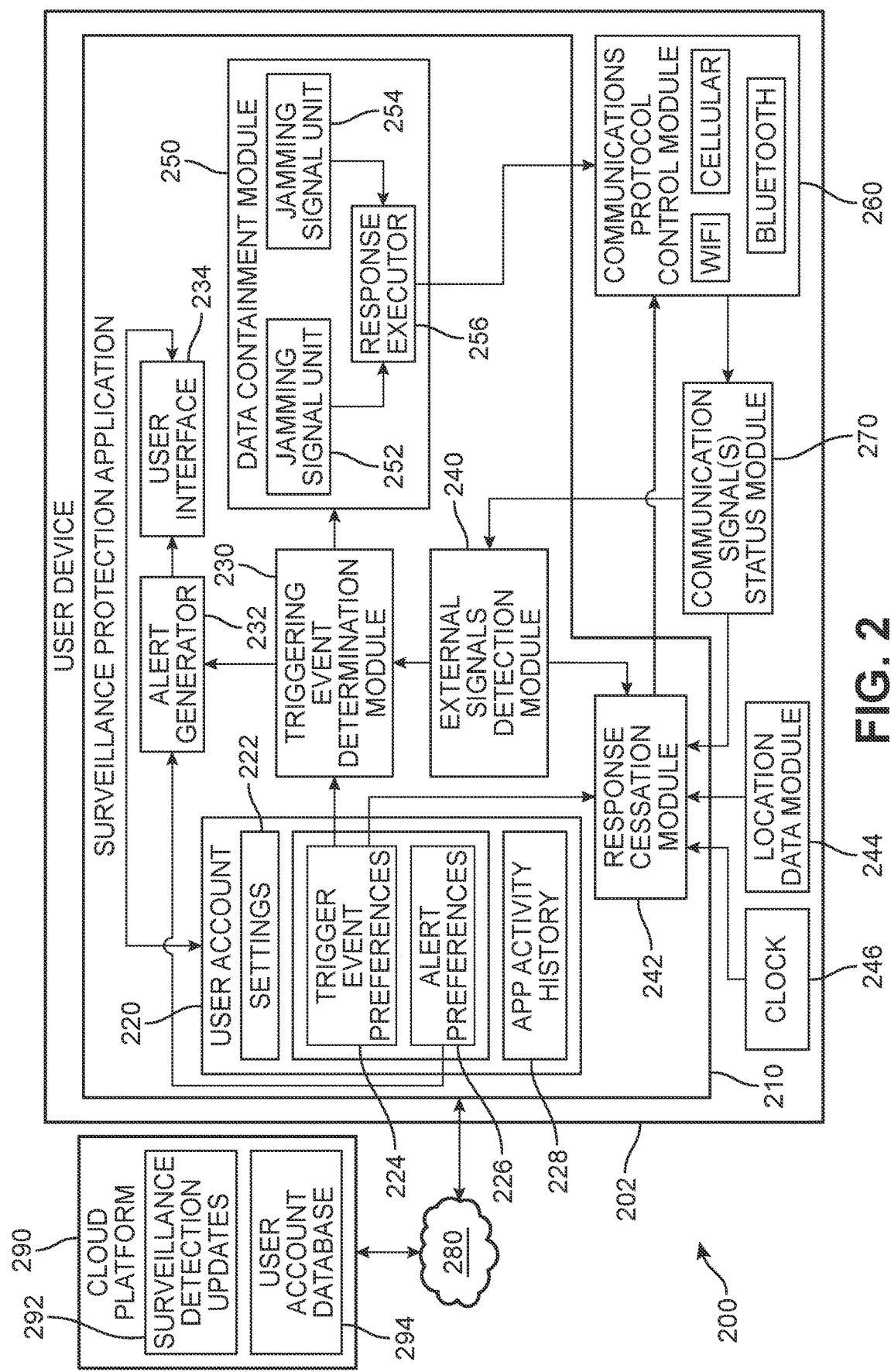
FIG. 2 is a schematic diagram of a surveillance protection system, according to an embodiment.

Referring now to FIG. 2, a schematic diagram representing the architecture of one embodiment of a surveillance protection system ("system") 200 is illustrated. In FIG. 2, the system 200 includes a user device 202, such as a mobile computing device, and an optional connection to a cloud-based platform ("platform") 290 over a network 280. In different embodiments, network 280 could include one or more Wide Area Networks (WANs), Wi-Fi networks, Bluetooth or other Personal Area Networks, cellular networks, as well as other kinds of networks.

In addition, user device 202 can include provisions for communicating with, and processing information from, platform 280 as well as other devices. It may be appreciated that different devices could communicate using different networks and/or communication protocols. For purposes of this disclosure, a communication protocol refers broadly to any type of communication system that enables wireless communications to/from a mobile device. The communication module of a user device 202 may include a wireless connection that implements or includes components providing one or more communication protocols such as Bluetooth® radio technology, communication protocols described in IEEE 802.11 (including any IEEE 802.11 revisions) such as Wi-Fi, as well as communication protocols that rely on cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections. A user device may further include one or more processors and memory. Memory may comprise a non-transitory computer readable medium. Instructions stored within memory may be executed by the one or more processors. In addition, each device may include a communication system such as a radio or other provisions for communicating using one or more communication methods. In particular, the communication system includes provisions for communicating with other nearby devices and/or platform 280 over a network. For example, each communication system could include a Wi-Fi radio, a Bluetooth radio, and/or a cellular network radio.

In some embodiments, an end-user can interact with the proposed system, for example via a user application ("application") 210. In some embodiments, the application 210 can be downloaded to be accessible locally on the device. The application 210 can offer a user settings and profile interface ("user interface") 234 for accessing and modifying settings and viewing application activity (see, for example, FIGS. 5-7). Such user account data 220 can include app-related user-specific information such as user settings 222, the user's selected trigger event preferences 224, user's desired alert preferences 226 (e.g., SMS messages, in-app messages, audio alerts, visual alerts, frequency of alerts, etc.) for each user device and/or type of triggering event, as well as an optional app activity history repository 228 that can store and present to the user (via user interface 234) various data reflecting past app-based warnings and responses. In some embodiments, the application 210 can be configured to connect to the platform 290 (for example, via a Wi-Fi or cellular connection) to add or modify information for the user account 220 that can also or alternatively be stored in the cloud, for example in a user account database 294.

As will be discussed in further detail below with reference to FIGS. 8A-9B, in different embodiments, the system is configured to detect various indications of a potential security breach or vulnerability, determine whether these indications correspond to a triggering event, and perform an automated protective operation in response to the triggering event. In FIG. 2, the user device 202 includes a communication signal(s) status module ("status module") 270 that receives data from, among other modules of device, a communication protocols control module ("control module") 260. The control module 260 refers to a control center for activating or enabling, deactivating or disabling, or otherwise managing particular types of communication protocols for user device 202. As an example, the control module 260 includes three types of communication protocols: Wi-Fi, Bluetooth, and cellular; however, other embodiments can include additional or alternative wireless protocols such as but not limited to Satellite, Radio Frequency (RF), RFID, and NFC. The information collected by the status module 270 can comprise a wide range of signals that represent the device's network activity in real-time as well as patterns of activity over time for the device.

Furthermore, the application 210 includes a network activity processor 240 for receiving and processing the data shared from status module 270. A triggering event determination module ("triggering module") 230 can receive the processed data from the network activity processor 240 which allows the triggering module 230 to determine whether the device is in an environment, scenario, or other condition whereby user device networks are vulnerable or otherwise corresponds to a state that has been previously identified (e.g., by the user) as a state that should activate or trigger activation of a data containment module 250 for example, per trigger event preferences 224, and/or trigger activation of alert generator 232 for example, per alert preferences 226. For example, the alert generator 232 can send a request to a device-based messaging service to cause an alert message to be displayed at the user's device presenting the pertinent information or providing links to the information. In another example, the alert generator 232 can send a message directly to the user's cellular number (text or phone) that presents the warning information more directly. Furthermore, in some embodiments, the platform 290 can provide user devices with the ability to receive updates regarding indications of potential surveillance events. In one embodiment, user feedback may be collected (e.g., crowd-sourced) to compile a list of locations or networks that have been associated with surveillance activity and may be considered danger zones (i.e., high-risk network activity areas). For example, in some embodiments, the user may identify or accept the system's recommendations for one or more locations or regions as being either safe zones (where one or more types of network activity should remain unrestricted) or high-risk zones (where one or more types of network activity should be restricted). If the application 210 receives information from a location data module 244 that the device has moved into a potential high-risk zone or area, the system may determine a triggering event has occurred. The location data can be continuously updated, and once the device is outside of the high-risk zone (corresponding to a response termination event), the application can trigger a release command via a cessation module 242.

Thus, in response to the determination of the occurrence of a triggering event, either by information obtained from control module 260 or other sensors for the device such as clock 246 and/or device location data module 244, the data containment module 250 can be configured to automatically implement a protective mechanism. Such a mechanism can broadly include either or both of a command to generate a jamming signal from the device via a jamming signal unit 252 or a command to deactivate of one or more types of device network signals via a disable signal unit 254. In another embodiment, the protective mechanism can instead involve alternative security measures, as discussed below with reference to FIG. 7. The protective measure can be implemented by a response executor 256 that transmits a command to control module 260.

In some optional embodiments, once the system verifies that the protective mechanism was successfully applied and the device has been safeguarded, a notification or other alert can be transmitted to the user indicating that the device is in lockdown or some other protective mechanism has been performed. In some other embodiments, prior to implementation of a protective mechanism, the data containment module 250 can present a query message to the user on the user device 202 that can notify the user of the determination of an occurrence of a triggering event and the type of triggering event detected, and can provide an opportunity to belay or otherwise prevent the operation of the data containment module 250 in this instance.

In different embodiments, while the protective mechanism can be manually activated or deactivated, the system can also offer users the ability to select limitations or conditions which may determine when the mechanisms are terminated. For example, a user may select a period of time and/or a specific time after which the protective mechanism should be withdrawn. An activation manager for a response cessation module 242, in conjunction with network activity processor 240 can refer to user preferences and device clock 246 to trigger a response only for a pre-determined amount of time (whereby the completion of the time period corresponds to a response termination event). Thus, the cessation module 242 can include or access a timer to determine when to transmit a command to the control module 260 to return device network activity to normal.

Figure 3:
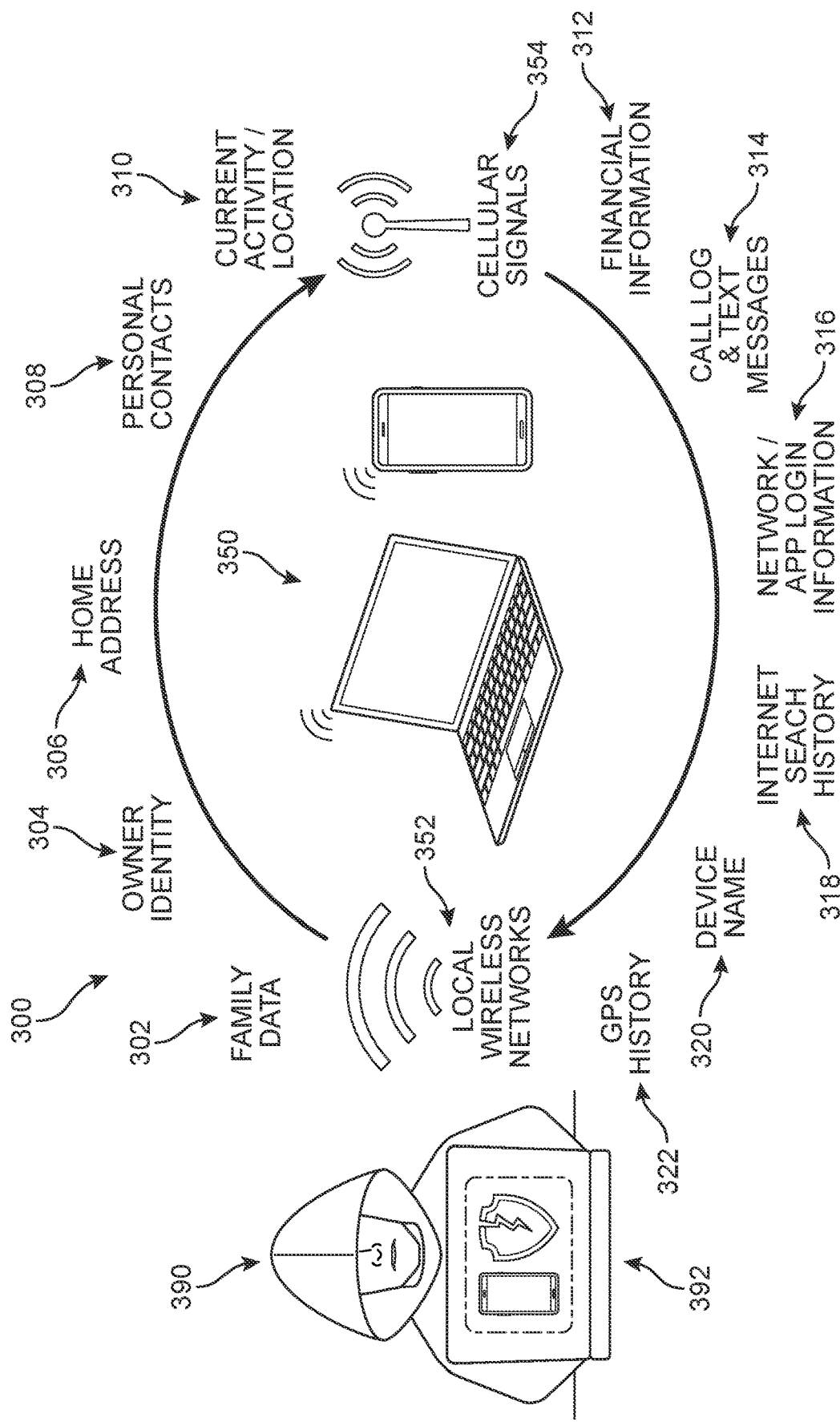
FIG. 3 is a schematic view of some examples of private information that may accessed by an unauthorized person via one or more vulnerable communication protocols, according to an embodiment.

For purposes of clarity, FIG. 3 depicts a range of additional examples of private information 300 that would be associated with cyberprivacy issues and may be vulnerable to hacking through illicit surveillance techniques 392 by unauthorized persons 390 over cellular towers (or IMSI catchers) 354 and/or local wireless networks 352 such as Bluetooth, Wi-Fi, NFC, Air-Drop®, etc. For example, during the course of regular use of a mobile device 350 such as a tablet, laptop, cell phone, private information may be generated and transmitted, including data directly identifying, related to, or connected to (a) an identity and personal preferences 304 of the device owner(s) (or other device users) including but not limited to social security numbers, account numbers, habitual destinations and schedules, birthdate, musical selections, etc.; (b) a residential or home address 306 of user; (c) personal contacts 308; (d) current activities and/or location of the user 310; (e) financial information 312 as well as clients with whom the user has contact or is conducting business for; (f) call logs and text messages 314; (g) device, network, or application login information 316; (h) internet search histories (318); (i) device name(s) and identifier(s) 320; (j) GPS and location history 322; and (k) family and friends (contacts) data 302, such as family or friend names, addresses, communications, email addresses, voice recognition, and media including images or information about minor children.

Such information may be collected actively, or may be discovered by a pattern of use. For example, the unauthorized user 390 may utilize one or more surveillance devices to monitor and possibly record information for a person such as websites visited, time spent per website, interest indications based on website viewing, advertisements served to the device, advertisements opened by the user, location of the user, searches conducted by the user, application usage profile, device user interface usage history, electronic commerce transactions, music or video files played, applications on device, and/or when the user is actively working or playing or inactive. Furthermore, in some cases, cyber surveillance or cyber monitoring includes monitoring one or more of the following: traffic associated with one or more users; traffic downstream and/or upstream data rate; total traffic received and/or transmitted over a period of time; traffic transmitted and/or received by IP addresses, domain names, URLs or other network address identifiers; traffic transmitted and/or received by email downloads or uploads; traffic transmitted and/or received by an application; traffic transmitted and/or received by network file transfers; traffic transmitted and/or received by file download or upload content types; traffic transmitted and/or received by mobile commerce transactions; traffic transmitted and/or received by one or more time periods; traffic transmitted and/or received by differing levels of network activity and network capacity availability; traffic transmitted and/or received by one or more delivered levels of quality of service; traffic transmitted and/or received by software downloads; traffic transmitted and/or received by application downloads; traffic transmitted and/or received by one or more activities associated with the service control plane link or other network related functions, or traffic that may not directly result in service usage or service activity that the user values or desires; traffic transmitted and/or received to support one or more service provider third party service partner offerings; software usage history; application usage history; device discovery history for UI components, applications, settings, tutorials; ads served history; ads visited history; and/or device location history. Thus, today's communication security is compromised by numerous vulnerabilities easily exploited by cyber pirates and useful for committing cybercrime and violations of cyberprivacy.

Such information may appear to be impersonal or innocuous, but the illicit recording of these patterns can be both intrusive and lead to greater exposure of the user. For example, the flow of data can be easily analyzed to reveal (a) the destination of an IP packet, including the destination IP address, the destination port #, and the destination MAC address, (b) the source of an IP packet, including the source IP address, the source port #, and the source MAC address; (c) the type of Layer 4 transport employed and by the port #the type of service requested and application data encapsulated in the IP packet's payload; (d) in unencrypted files, all application and file data encapsulated in the IP packet's payload, including personal and confidential information, login information, application passwords, financial records, videos, and photographs; (e) dialogues of communications, enabling a cyber party the repeated opportunity to break encrypted files; and (f) opportunities to install malware, including spyware and phishing programs and Trojan horses into communicating devices and routers using FTP, email, and web page based infections. In this regard, a cyber pirate is able to determine the "context" of a conversation, improving their opportunity to crack encryption, break password security, and gain unauthorized access to files, data, and payload content.

Figure 4A:
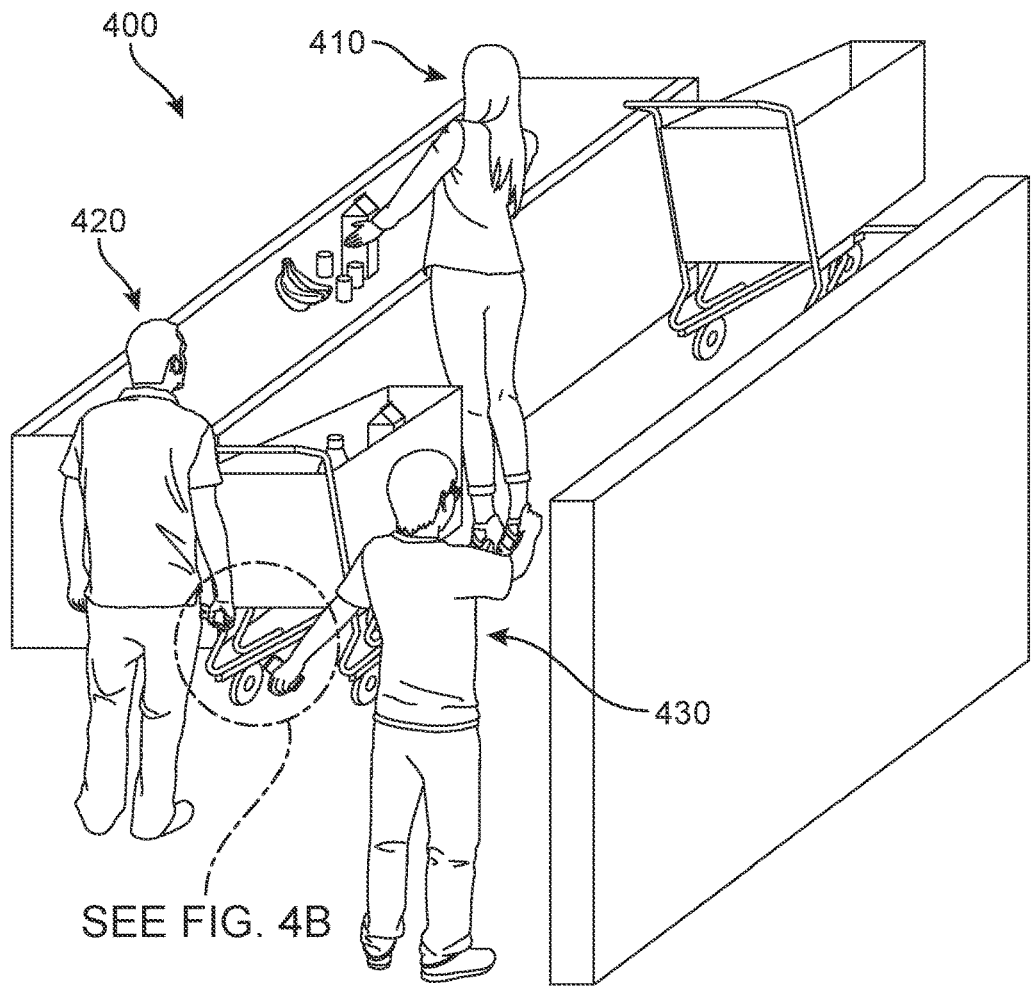
FIGS. 4A and 4B are a depiction of a customer waiting in line with a mobile device at a grocery store while a hacker attempts to conduct surveillance of the network activity from the mobile device, according to an embodiment.
Figure 4B:
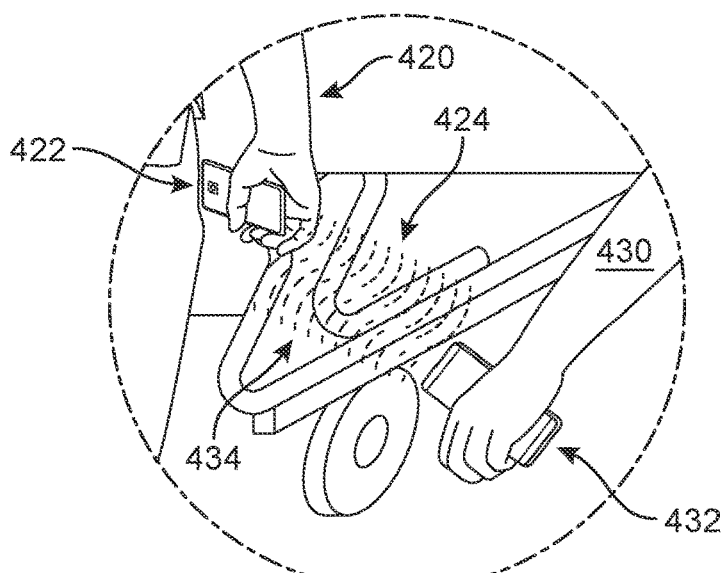

FIGS. 4A and 4B illustrate an example scenario showing how an unauthorized person may obtain information, instructions or other confidential data from a mobile phone using an illicit device that emulates a cell phone tower. In the illustration shown in FIG. 4A, and the enlarged view of FIG. 4B, an unauthorized person 430 is standing to the right of a customer 420 in a grocery store 400. Customer 420 is simply waiting his turn as a person 410 in front of him is loading groceries onto the conveyor belt at the cash register. As shown in FIG. 4B, the unauthorized person 430 is holding an invasive surveillance device ("invasive device") 432 in proximity of a mobile phone 422 held by customer 420. The invasive device 432 contains an emulator that emulates the functions and characteristics of a cell phone tower (e.g., a Stingray device). For example, invasive device 112 may be configured to mimic a cell tower, and 'trick' nearby devices to connect to this source via a passive or active signal 434. This type of technology has been used by criminals and police alike to bypass the routine process of obtaining fee-based location data from cell service providers like Sprint, AT&T, Verizon, T-Mobile and Comcast and target phones by their unique identifying numbers, collecting data such as location information, audio, text, and images.

In this scenario illustrated in FIGS. 4A and 4B, invasive device 432 has a clear unobstructed path to mobile phone 422. However, in many instances invasive device 432 may not need such a clear unobstructed path, because typical clothing, wallets or purses, or even walls most often do not present a significant obstacle to its signals. Also, invasive device 432 may emit its signals at a higher amplitude and intensity than do actual cell towers, such that the nearby cell devices are more likely to connect to the invasive device 432. At this time, the customer 420 is distracted by his shopping experience, and may not even be using his mobile phone 422. However, because the mobile phone 422 is switched on and currently configured for a cellular network connection, signals 424 emitted by mobile phone 422 are exposed to the surveillance by unauthorized person 430.

Figure 5:
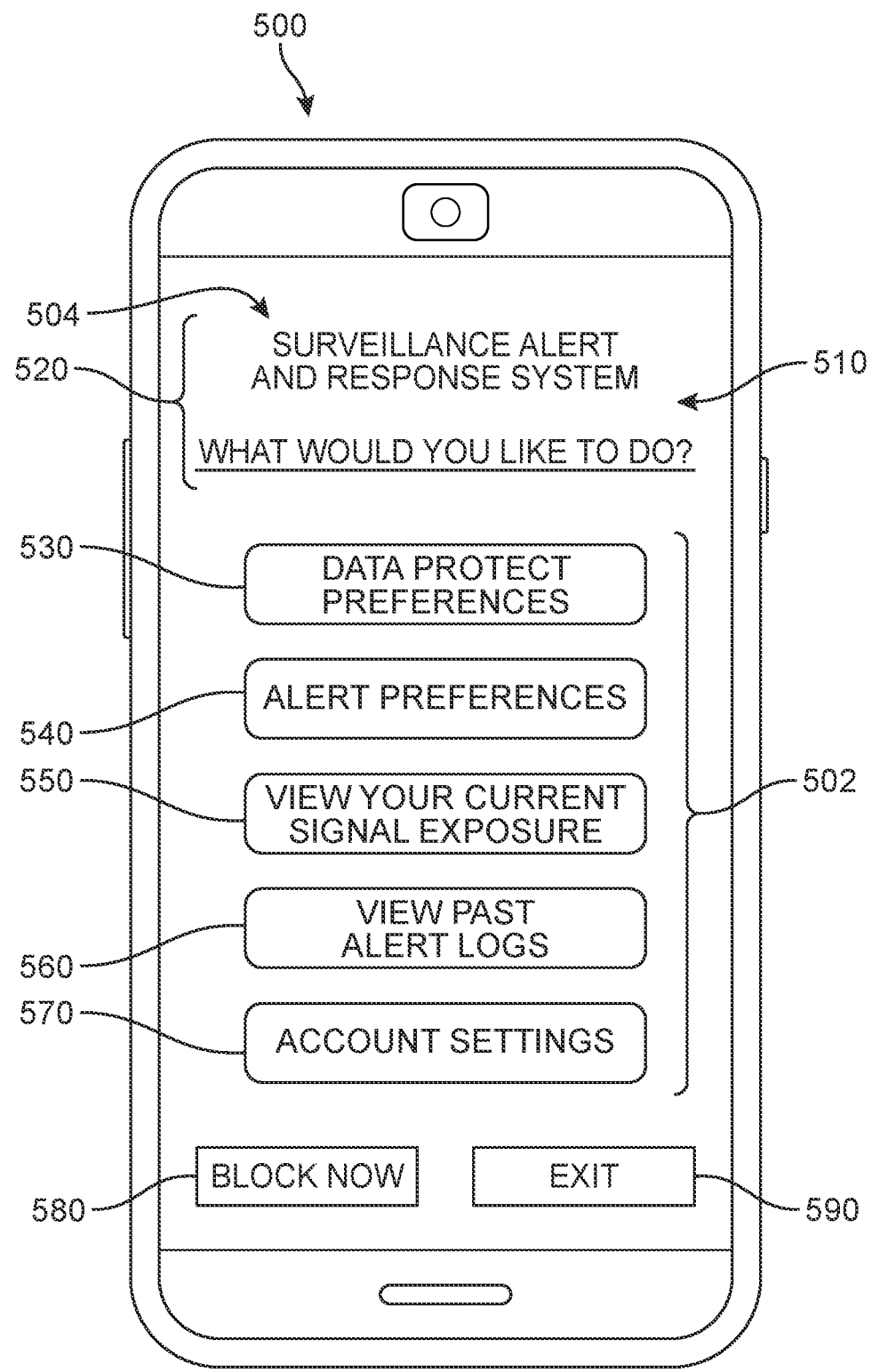
FIG. 5 is an example of a user interface for a main menu of a surveillance protection application, according to an embodiment.
Figure 6:
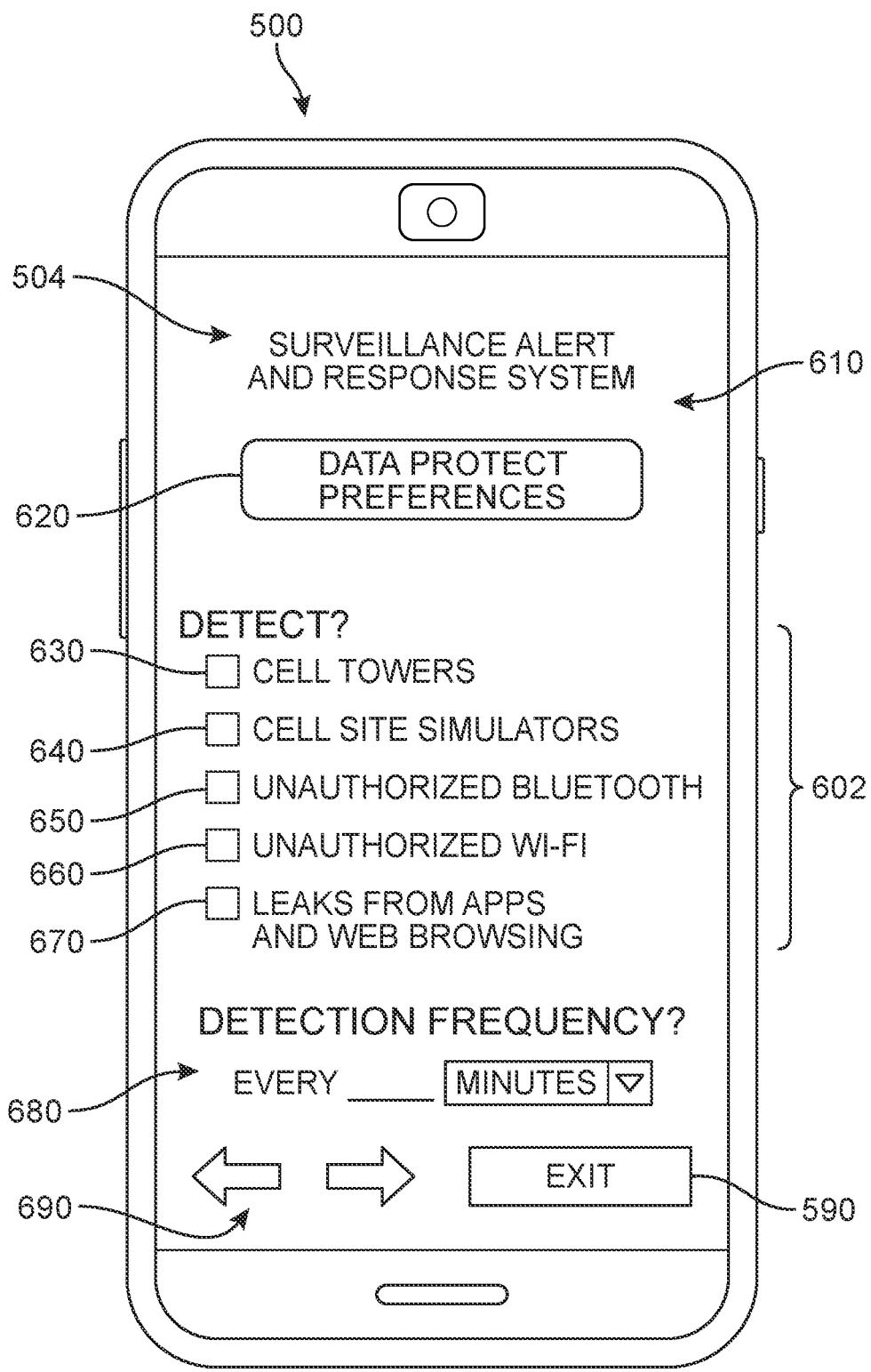
FIG. 6 is an example of a user interface for selecting surveillance detection preferences for a surveillance protection application, according to an embodiment.
Figure 7:
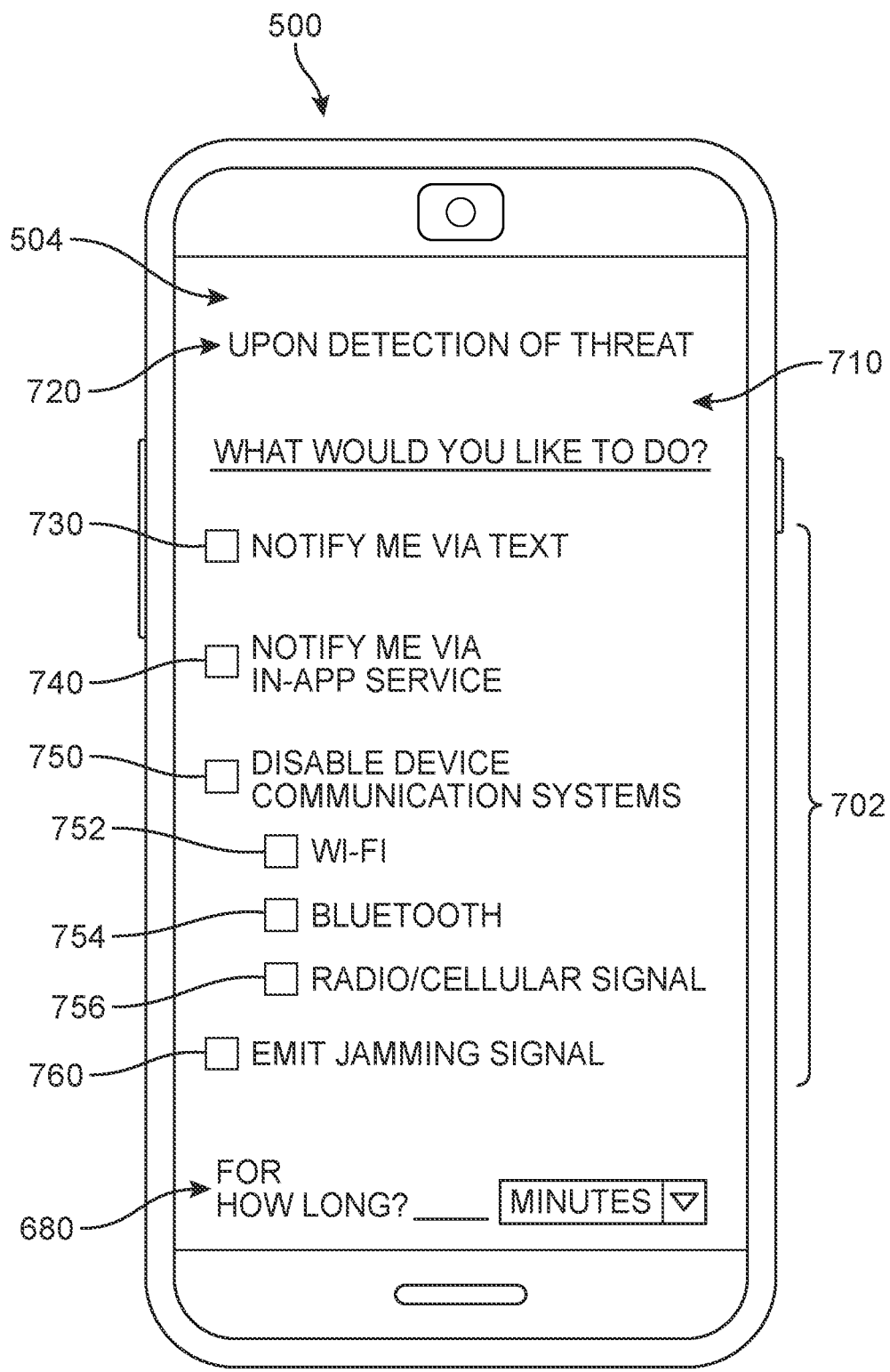
FIG. 7 is an example of a user interface for selecting surveillance protection response preferences for a surveillance protection application, according to an embodiment.
Figure 8A:
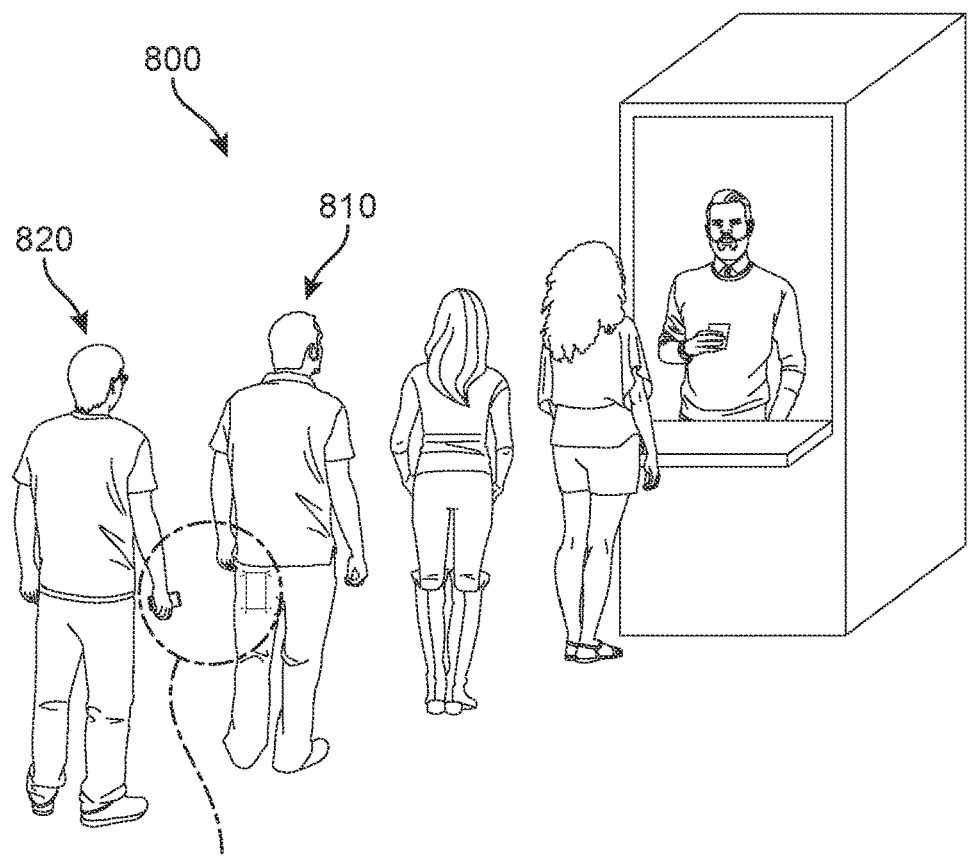
FIGS. 8A and 8B depict an example of a user waiting outside a movie theater while a hacker attempts to conduct surveillance of the network activity from the user's mobile device, according to an embodiment.
Figure 8B:
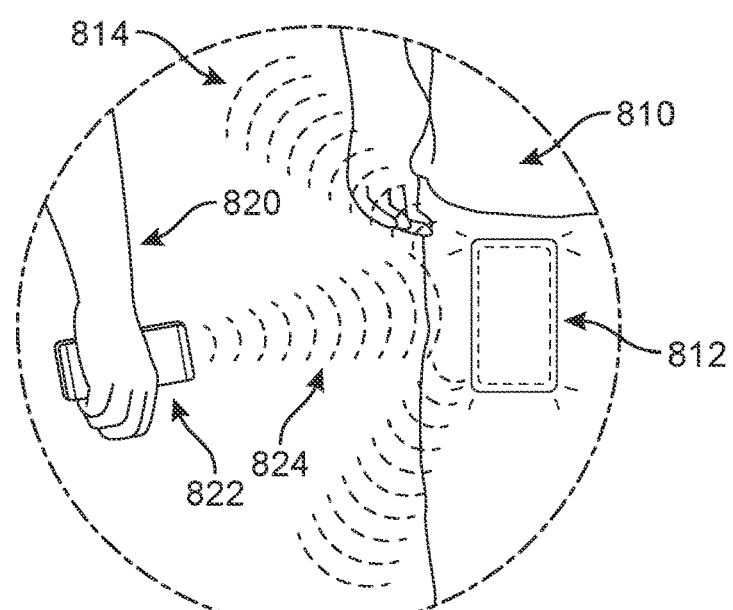

Upon learning of this or other types of vulnerabilities to the security of his data, the customer 420 may engage a service providing protections from such unauthorized monitoring. For example, referring to FIGS. 5-7, some aspects of the proposed systems and methods may be implemented by use of a software application ("app") 504 installed on the user's mobile device 500. FIGS. 5-7 depict presents three examples of a representative privacy management app interface ("interface") for implementing a mobile data protection system. In some embodiments, the application may be configured to communicate with an online service provider to modify the user settings in the cloud, device network, and automatically update the corresponding settings across multiple devices of that user the next time one of his or her devices is connected to the cloud service. The application can be accessed via any user computing device configured for connection to a network.

In FIG. 5, an example of a 'main menu' application interface ("main interface") 910 is presented on a touchscreen display of mobile device 500 offering content via native controls included in the main interface 510. Throughout this description, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation The main interface 510 can include a welcome header message 520, as shown in FIG. 5 ("Surveillance Alert and Response System/What would you like to do?"). In addition, a plurality of options 502 can also be presented that, when selected, cause the app 504 to offer other interface options and features. Some non-limiting examples of such options 502 are shown in FIG. 5, including a first option 530 ("Data Protect Preferences") for reviewing and modifying various triggering events and responses by the system. A second option 540 ("Alert Preferences") allows the user to select how and when he or she should be informed of potential threats and responses by the system. A third option 550 ("View Your Current Signal Exposure") allows the end-user to see a quick overview, for example in a dashboard or other graphical format, of the wireless signals currently being emitted by the mobile device 500, as well as the presence of nearby devices that may be able to monitor these signals and/or other potential vulnerabilities identified for mobile device 500. A fourth option 560 ("View Past Alert Logs") allows the user to review previous periods in which the system detected potential hacking events, types of data that may have been exposed, and/or a historical log of the security responses that have been performed by the system. A fifth option 570 ("Account Settings") may be selected by the user to update his or her own account information, such as login and password data, subscription data, or other profile data.

In some embodiments, the main interface 510 can include further options or a secondary menu by which the user can trigger an immediate lockdown of the mobile device 500, whereby the signals and data associated with the device cannot be accessed by anyone until the lock has been disabled. This lockdown option 580 gives users the ability to manually initiate a protection of their information in situations where there is a belief that they are entering or have entered a space that appears suspicious. An exit option 590 allows the user to leave the app 504.

In other embodiments, one or more options 502 can be used to offer the user further options or a secondary menu by which a user can choose to what threat types the system should respond, such as via first option 530. In FIG. 6, an example of a data protection menu 610 is presented on the touchscreen display of mobile device 500, offering content via native controls. In this example, the data protection menu 610 can include a welcome header message 620, as shown in FIG. 6 ("Data Protect Preferences"). In addition, a plurality of options 602 can also be presented that, when selected, cause the app 504 to enable detection of one or more signal vulnerabilities. Some non-limiting examples of such options 602 are shown in FIG. 6, including cell towers 630, cell site simulators (such as IMSI catchers) 640, unauthorized Bluetooth surveillance 650, unauthorized Wi-Fi surveillance 660, and leaks from apps and/or web browsing 670. These options are presented for purposes of illustration only, and other embodiments can include additional or alternative options for various network protocols, such as but not limited to BLE, Zigbee, Z-Wave, 6LoWPAN, Thread, WiFi-ah (HaLow), 2G, 3G, 4G, LTE Cat 0, 1, & 3, LTE-M1, NB-IoT, 5G, NFC, RFID, SigFox, LoRaWAN, Ingenu, Weightless-N, Weightless-P, Weightless-W, ANT & ANT+, DigiMesh, MiWi, EnOcean, Dash7, WirelessHART, AirDrop®, etc. In other words, the system can be configured to detect attacks that threaten mobile security data across a wide range of communication protocols and respond accordingly. In some embodiments, the app 504 can be configured to detect continuously, while in other embodiments, the user can select a detection frequency 680 over which the system seeks out signs of surveillance across one more of these communication protocols, thereby reducing energy consumption by the app 504. In other embodiments, the app 504 can offer an option to allow the user to enable surveillance detection only when the mobile device 500 is physically outside of a pre-designated "home zone" or other "safe zone".

In some embodiments, navigation options 690 can also be provided that allow the user to view additional app features.

For example, in FIG. 7, a user can navigate to a threat response menu 710 offered by app 504 through which a user can choose how the system should respond. In this example, the threat response menu 710 can include a welcome header message 720 ("Upon Detection of Threat/What Would You Like To Do?"). In addition, a plurality of options 702 can also be presented that, when selected, cause the app 504 to respond with specific actions following detection of one or more signal vulnerabilities (see FIG. 6). Some non-limiting examples of such options 702 are shown in FIG. 7, including the presentation of text or audio notifications 730 and in-app notifications or pop-up messages 740, as well as the ability to automatically disable some or all device communication protocols. For example, a user can choose to allow for disconnection of all communication protocols ("Disable Device Communication Systems") 750, or selective disconnection (e.g., Wi-Fi 752, Bluetooth 754, Radio/Cellular Signal 756, etc.). Alternatively, or in addition to this response, the system can be configured to emit a jamming signal 780, as will be discussed below. Each of these responses can be maintained indefinitely, or the user can select a specific duration 770 to engage each response, after which the response will be revoked and the previous communication protocol settings are re-established.

In other embodiments, the system can offer other response types not shown in FIG. 7. As some non-limiting examples, the app 504 may allow the user to request that the system respond to detected hacking attempts by a (a) MAC Address Randomization feature whereby the system randomly changes the MAC address reported by the phone, making tracking far more difficult; (b) deactivation of AirDrop®, which refers to a wireless file sharing protocol for iPhone® users and broadcasts an iPhone's availability to other nearby iOS devices; (c) disablement of risky or unused services or apps to reduce the attack surface, and other such protective responses.

In different embodiments, the system can be configured with a schedule whereby such responses occur at a point in the future, and/or occur for blocks of time on a regular or repeating basis. For example, if the user knows he or she will be on vacation in an unsecured environment for the next week, he or she can schedule a data lockdown in advance as a proactive security measure. The lockdown can be indefinite (i.e., remain in place until disabled) or be implemented for a specified period of time. Thus, in some embodiments, the system can permit a user to specifically identify the types of triggering events and/or conditional detection rules that will trigger an automatic security response. In some other embodiments, the system may be configured to alert the user when it appears that the communication protocol(s) for device is about to be disabled, and allow the user to delay or cancel the upcoming response.

It should be understood that the text and specific wording shown in the figures are for purposes of illustration only and in no way limit the manner by which the application may communicate or receive information. In addition, while the options are shown as a list in FIGS. 5-7, it should be understood that in other embodiments one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Referring now to FIGS. 8A-9B, a sequence of schematic illustrations is depicted showing an embodiment of an attempt at accessing device data by unauthorized users is thwarted by the proposed systems. In the example shown in FIGS. 8A and 8B, an owner 810 of a cell phone 812 is waiting in line for tickets at a movie theater 800. The cell phone 812 is tucked into owner's back pocket. A nearby hacker 820 is holding a surveillance device 822, which is directed 824 at the cell phone 812 in owner's back pocket, while cell phone 812 emits typical communication signals 814 as discussed above.

In order for the cell phone 812 to be protected from the potentially harmful activities of the surveillance device 822, the system installed on cell phone 812 may be configured to distinguish with reasonable certainty between legitimate signals and illegitimate signals. This may not always be possible though, and so the system may be configured to trigger a protective response (see FIG. 7) any time the cell phone 812 is outside of a pre-designated safe network or zone. However, in some cases, the system may execute a surveillance detection model that may distinguish between, for example, an IMSI catcher and a legitimate cell tower base station. For example, the model may be configured to trigger a response if detection of one or more indicators for the possible presence of IMSI catchers have been presented. In some embodiments, the system collects and analyzes mobile radio data to make a user aware of mobile network security and/or warn the user about threats such as IMSI catchers and user tracking (i.e., abnormal network activity for that mobile device).

In different embodiments, such indicators can be based on network activity heuristics and are useful to warn the users about a potential presence of a fake cell tower, and may include, but are not limited to (a) the geographical location of the tower and/or a detection of a lack of location information by the base station; (b) if the expected location of the purported tower is more than a predetermined distance from the current location of the cell phone (because a cell tower with that identifying information should not be in the vicinity of the cell phone); (c) whether identifying information provided by the purported tower aligns with a list of identifying information for base stations that are known to be legitimate; (d) whether the signal strength from the purported tower is above a predetermined level, because IMSI catchers often radiate higher signal strengths than legitimate tower stations in order that they preferentially receive connection requests from communications devices; (e) whether there is a sudden appearance of an available cell tower, for example by step change in signal strength from the purported base station; (f) lack of expected communications services available to the cell phone from the purported base station; (g) a lack of a DNS (Domain Name System) service by the purported tower; (h) a lack of a 'keep alive' signal from within the provider network; (i) a request from the purported base station to the cell phone to change the mode of communication with the base station (e.g., a request to change to a lower connection speed); (j) a request to turn off the use of a Temporary Mobile Subscriber Identity (TMSI); (k) a request to turn off encryption; and/or (l) abnormal delays in network activity. These types of characteristics and indications can be used by the system to determine the legitimacy of a base station in a cellular network and trigger an appropriate security response as selected previously by the user or other default settings.

Figure 9A:
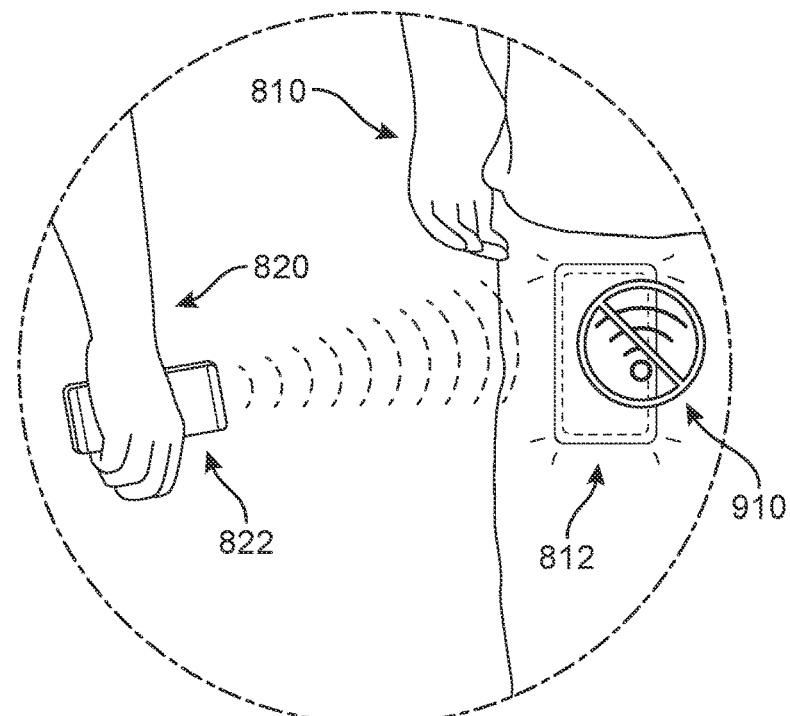
FIG. 9A is an example of a protective response mechanism in which network activity for the mobile device of FIG. 8B is disabled.
Figure 9B:
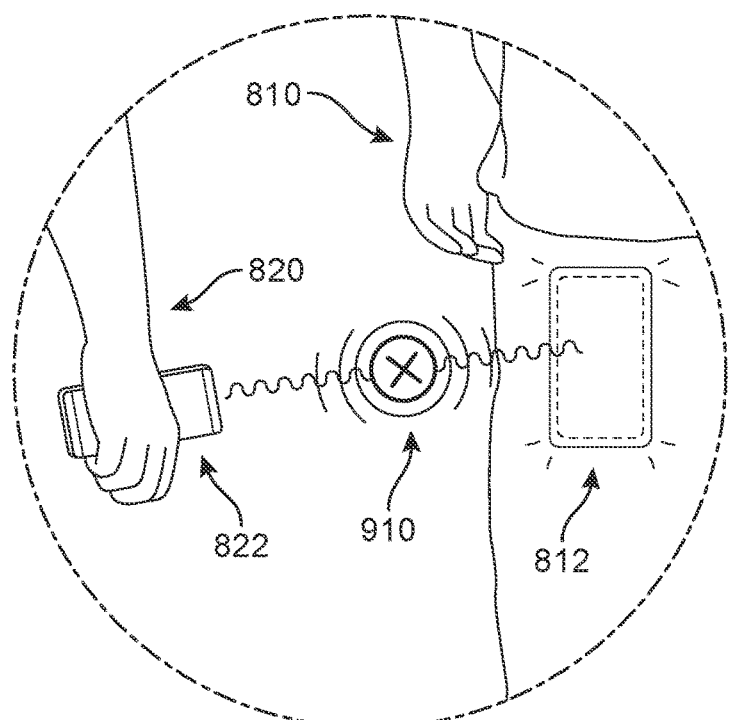
FIG. 9B is an example of a protective response mechanism causing the mobile device of FIG. 8B to emit a jamming signal.

FIGS. 9A and 9B depict two example responses that may be implemented by the system upon detection of a triggering event. As described earlier, in the event that the system determines an unauthorized user is attempting to monitor the cell phone 812 and/or a threat to the cell phone's mobile data security is likely or possible (depending on the threshold of intrusion selected by the user or other default settings), the system can initiate a protective response. In FIG. 9A, the system triggers a disablement, deactivation, or cessation 910 of one or more communication protocols, thereby preventing any communications from being monitored by the surveillance device 822. Similarly, in FIG. 9B, the system triggers a jamming or blocking signal 910 that effectively shields the cell phone 812 from the monitoring by surveillance device 822. The cell phone 812 can deliberately transmit signals on the same radio frequencies as the surveillance device 822, disrupting the communication between the phone and the surveillance device 822, and preventing the surveillance device 822 from receiving signals and from transmitting them. In other examples, the system can cause ultrasonic signals to be emitted by the cell phone 812, preventing the capture of any audio-based data. Thus, although in this example the owner 810 likely was at least initially unaware that an attempt was made to obtain his private information, he may be automatically protected from this attempt by the system's protective responses as described herein.

Figure 10:
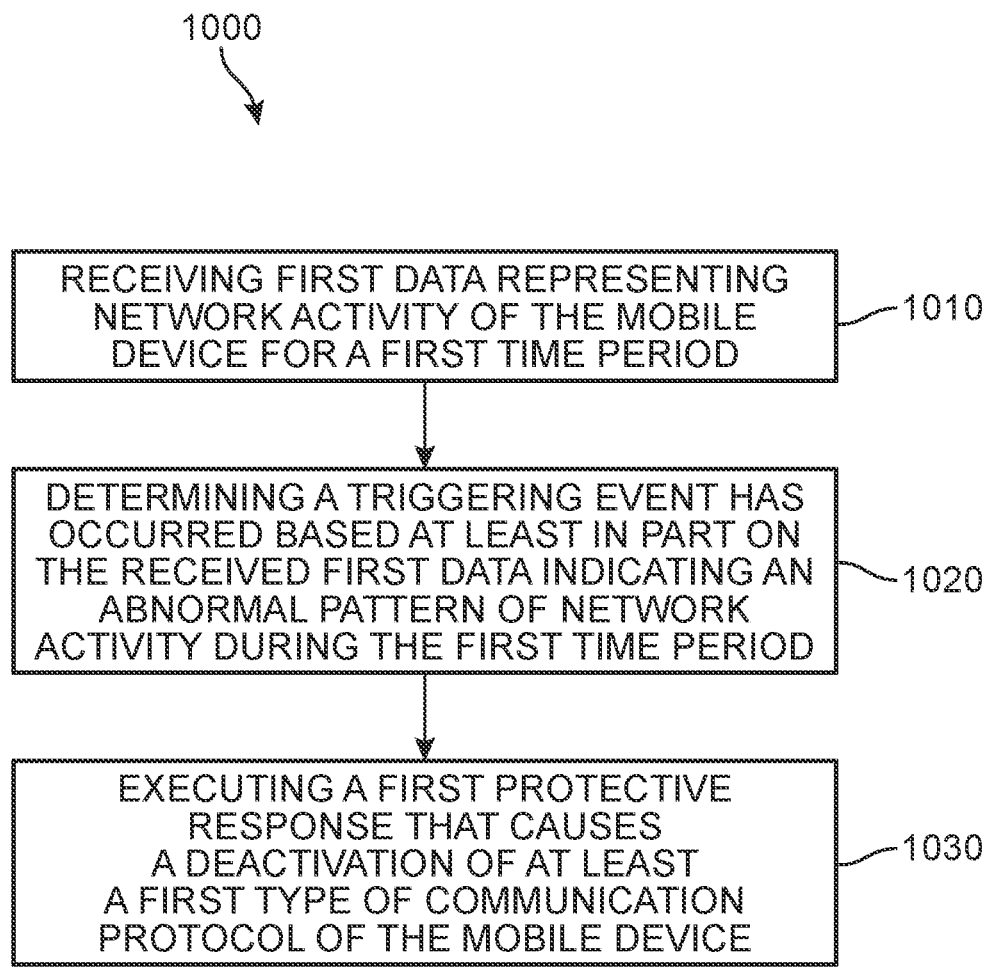
FIG. 10 is a flow chart depicting a process of protecting a mobile device from cyber-surveillance, according to an embodiment.

FIG. 10 is a flow chart illustrating an embodiment of a method 1000 of protecting a mobile device from cyber-surveillance. In a first step 1010, the method 1000 includes receiving first data representing network activity of the mobile device for a first time period. A second step 1020 includes determining a triggering event has occurred based at least in part on the received first data indicating an abnormal pattern of network activity during the first time period. Finally, a third step 1030 includes executing, in response to determining that the triggering event has occurred, a first protective response that causes a deactivation of at least a first type of communication protocol of the mobile device.

In other embodiments, the method may include additional steps or aspects. In one embodiment, the method also includes steps of causing a notification to be presented by the mobile device requesting that a user of mobile device confirm that the first protective response should be implemented, receiving confirmation from the user, such that the first protective response is executed only in cases where confirmation from the user is received. In another embodiment, the method can also include a step of executing, in response to determining that the triggering event has occurred, a second protective response that causes the mobile device to emit a jamming signal for a first period of time. In one example, the first type of communication protocol is one of a cellular, Wi-Fi, and Bluetooth connection. In another example, the first protective response comprises a deactivation of all types of communication protocols for which the mobile device is configured.

Other methods may be contemplated within the scope of the present disclosure. For example, in some embodiments, a method of protecting a mobile device from cyber-surveillance can include a first step of receiving first data representing location activity of the mobile device, a second step of determining a triggering event has occurred based at least in part on the received first data indicating the mobile device has entered a high-risk area for network usage, and a third step of executing, in response to determining that the triggering event has occurred, a first protective response that causes a deactivation of at least a first type of communication protocol of the mobile device.

In other embodiments, this method may include additional steps or aspects. In one embodiment, the method may also include a step of receiving second data representing network activity of the mobile device for a first time, such that determining the triggering event has occurred is further based on the received second data indicating an abnormal pattern of network activity during the first time. For example, this may occur where the second data includes data indicating a presence of an IMSI catcher in network range of the mobile device, as discussed earlier. In another embodiment, the method can further include steps of presenting an application interface on a display of the user device (where the application interface including a plurality of options for managing preferences for deployment of the first protective response), receiving, via the application interface, a request to terminate the first protective response after a first time period, and then causing, after the first time period, the at least first type of communication protocol to be reactivated.

In some embodiments, the method may also include a step of executing, in response to determining that the triggering event has occurred, a second protective response that causes the mobile device to emit a jamming signal for the first time period, such as an ultrasonic signal that can prevent nearby devices from monitoring the user's device. In another example, the method can include steps of receiving second data representing location activity of the mobile device, determining a termination event has occurred based at least in part on the received second data indicating the mobile device has exited the high-risk area, and causing, in response to determining that the termination event has occurred, the at least first type of communication protocol to be reactivated. In one embodiment, the method further includes receiving, at the mobile device, security updates from a cloud-based platform identifying one or more high-risk areas for network usage.

As described herein, the proposed systems and methods offer mobile device users the ability to respond in real-time to surveillance threats by enabling a type of cloaking mode for the device. While conventional devices have airplane mode or other modes that simply switch off various device signals, embodiments of the proposed systems empower users with additional security options in which the mobile device is configured to search continuously for indications of network activity and/or external signals that suggest the presence of other smart devices in the user's vicinity which may be monitoring the user. In some cases, upon detecting the presence of these external signals, the device may simply switch off one or more communication systems on the user's device (such as Wi-Fi or Bluetooth) until the device is outside the range of the monitoring devices or a preselected period of time has passed. In other cases, upon detecting the presence of these external signals, the device may generate a jamming signal that prevents the monitoring devices from transmitting and receiving signals that could be used to track or otherwise monitor information about the user.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of protecting a mobile device from cyber-surveillance, the method comprising:
   receiving first data representing network activity of the mobile device for a first time period;
   determining a triggering event has occurred based at least in part on the received first data indicating an abnormal pattern of network activity during the first time period; and
   causing a notification to be presented by the mobile device requesting that a user of the mobile device confirm that a first protective response should be implemented;
   receiving confirmation from the user; and
   executing, in response to determining that the triggering event has occurred and the receiving of confirmation from the user, the first protective response thereby causing a deactivation of at least a first type of communication protocol of the mobile device.

2. The method of claim 1, further comprising:
   receiving second data representing location activity of the mobile device; and
   wherein determining the triggering event has occurred is further based on the received second data indicating the mobile device has entered a high-risk area for network usage.

3. The method of claim 1, further comprising:
   presenting an application interface on a display of the mobile device, the application interface including a plurality of options for managing preferences for deployment of the first protective response;
   receiving, via the application interface, a request to terminate the first protective response after a first time period; and
   causing, after the first time period, the first type of communication protocol to be reactivated.

4. The method of claim 1, wherein the first type of communication protocol is one of a cellular, Wi-Fi, and Bluetooth connection.

5. The method of claim 1, wherein the first protective response comprises a deactivation of all types of communication protocols for which the mobile device is configured.

6. The method of claim 1, further comprising executing, in response to determining that the triggering event has occurred, a second protective response that causes the mobile device to emit a jamming signal for a first period of time.

7. A method of protecting a mobile device from cyber-surveillance, the method comprising:
   receiving first data representing location activity of the mobile device;
   determining a triggering event has occurred based at least in part on the received first data indicating the mobile device has entered a high-risk area for network usage;
   executing, in response to determining that the triggering event has occurred, a first protective response that causes a deactivation of at least a first type of communication protocol of the mobile device; and
   executing, in response to determining that the triggering event has occurred, a second protective response that causes the mobile device to emit a jamming signal for a predetermined time period.

8. The method of claim 7, further comprising:
   receiving second data representing network activity of the mobile device for a first time; and
   wherein determining the triggering event has occurred is further based on the received second data indicating an abnormal pattern of network activity during the first time.

9. The method of claim 7, further comprising:
   presenting an application interface on a display of the mobile device, the application interface including a plurality of options for managing preferences for deployment of the first protective response;
   receiving, via the application interface, a request to terminate the first protective response after a first time period; and
   causing, after the first time period, the first type of communication protocol to be reactivated.

10. The method of claim 7, further comprising receiving second data representing location activity of the mobile device; and
    determining a termination event has occurred based at least in part on the received second data indicating the mobile device has exited the high-risk area.

11. The method of claim 7, further comprising:
    causing, in response to determining that the termination event has occurred, the first type of communication protocol to be reactivated.

12. The method of claim 7, further comprising receiving, at the mobile device, security updates from a cloud-based platform identifying one or more high-risk areas for network usage.

13. The method of claim 8, wherein the second data includes data indicating a presence of an IMSI catcher in network range of the mobile device.

14. A system for protecting a mobile device from cyber-surveillance, the system comprising a processor and machine-readable media including instructions which, when executed by the processor, perform the following steps:
    receiving first data representing network activity of the mobile device for a first time period;
    determining a triggering event has occurred based at least in part on the received first data indicating an abnormal pattern of network activity during the first time period;
    causing a notification to be presented by the mobile device requesting that a user of the mobile device confirm that a first protective response should be implemented;

receiving confirmation from the user; and executing, in response to determining that the triggering event has occurred and the receiving of confirmation from the user, the first protective response thereby causing a deactivation of at least a first type of communication protocol of the mobile device;

wherein the first protective response is executed only in cases where confirmation from the user is received.

15. The system of claim 14, wherein the instructions further cause the processor to:

receive second data representing location activity of the mobile device; and wherein determining the triggering event has occurred is further based on the received second data indicating the mobile device has entered a high-risk area for network usage.

16. The system of claim 14, wherein the instructions further cause the processor to:

present an application interface on a display of the user device, the application interface including a plurality of options for managing preferences for deployment of the first protective response.

17. The system of claim 14, wherein the first type of communication protocol is one of a cellular, Wi-Fi, and Bluetooth connection.

18. The system of claim 14, wherein the first protective response comprises a deactivation of all types of communication protocols for which the mobile device is configured.

19. The system of claim 14, wherein the instructions further cause the processor to execute, in response to determining that the triggering event has occurred, a second protective response that causes the mobile device to emit a jamming signal for a first period of time.

20. The system of claim 16, further including instructions for:

receiving, via the application interface, a request to terminate the first protective response after a second time period; and causing, after the second time period, the first type of communication protocol to be reactivated.

\* \* \* \* \*